United States Patent [19]

Falcoff

[11] Patent Number: 5,050,922
[45] Date of Patent: Sep. 24, 1991

[54] OVERHEAD CONSOLE HAVING A PIVOTABLE STORAGE SHELF-DOOR

[75] Inventor: Monte L. Falcoff, Southfield, Mich.

[73] Assignee: United Technologies Automotive, Dearborn, Mich.

[21] Appl. No.: 444,482

[22] Filed: Nov. 30, 1989

[51] Int. Cl.⁵ .................................................. B60R 7/04
[52] U.S. Cl. .................................... 296/37.7; 296/37.8; 224/311
[58] Field of Search ............. 296/37.1, 37.5, 37.7, 296/37.8; 224/42.42, 282, 311

[56] References Cited

U.S. PATENT DOCUMENTS

| | | |
|---|---|---|
| 4,275,913 | 6/1981 | Marcus ............................ 296/37.1 |
| 4,368,937 | 1/1983 | Palombo et al. ............... 296/37.7 X |
| 4,469,365 | 9/1984 | Marcus et al. .................... 296/37.7 |
| 4,867,498 | 9/1989 | Delphia et al. ............... 296/37.8 X |

FOREIGN PATENT DOCUMENTS 2489221 3/1982 France ............................. 296/37.8

Primary Examiner—Dennis H. Pedder
Assistant Examiner—Andrew C. Pike

[57] ABSTRACT

An overhead console (5) for a motor vehicle or the like includes a wall structure (30) including a rearwardly and downwardly facing portion (55) with opening (60) therein. The opening is closed by a door (80) in the shape of a tray, which blends smoothly into wall portion (55).

4 Claims, 1 Drawing Sheet

U.S. Patent       Sep. 24, 1991       5,050,922
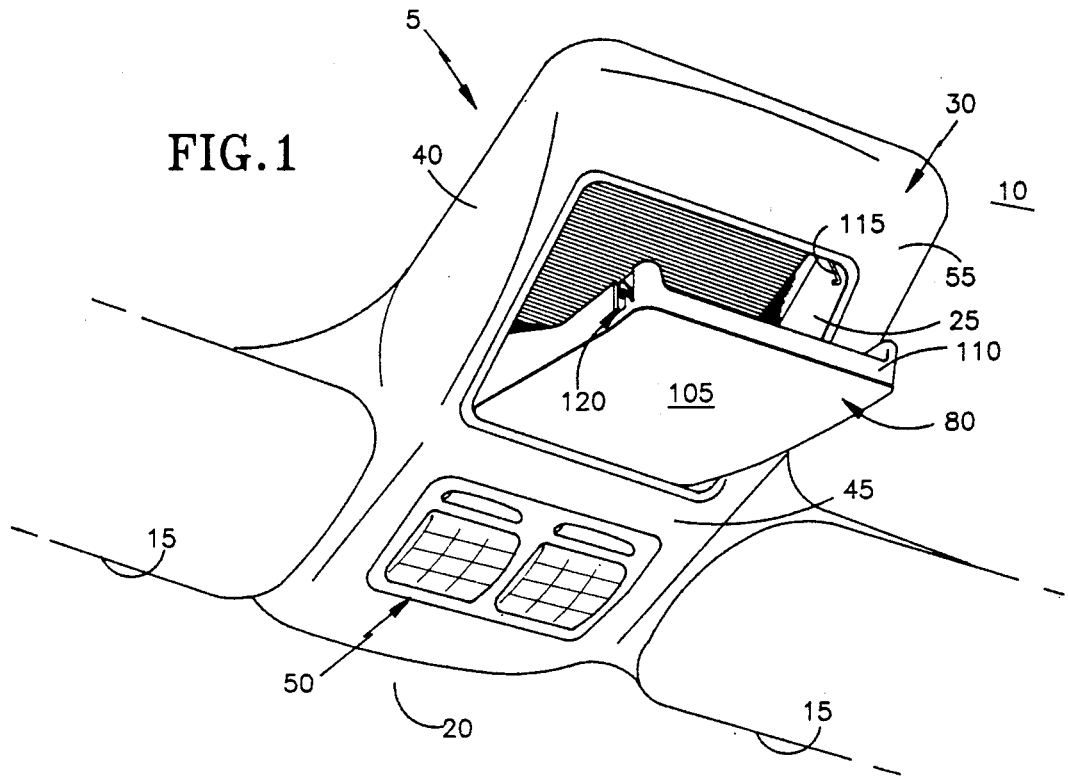
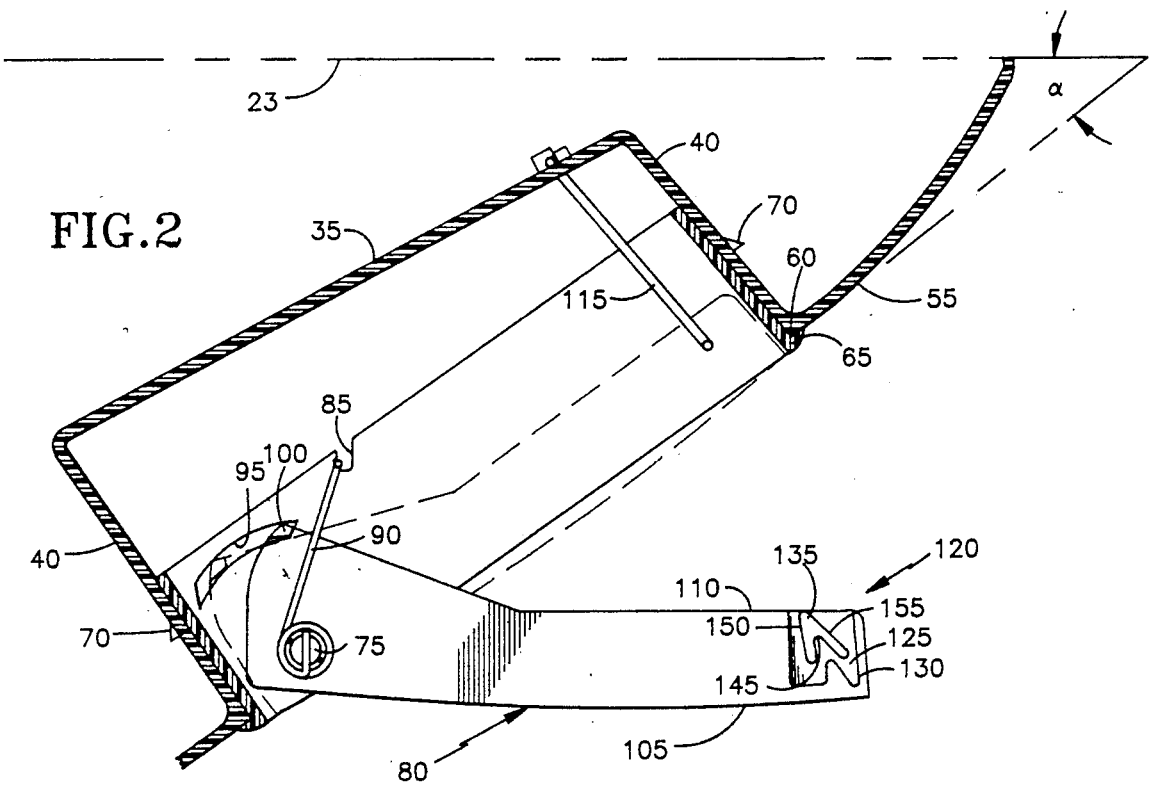

OVERHEAD CONSOLE HAVING A PIVOTABLE STORAGE SHELF-DOOR

DESCRIPTION

1. Technical Field

This invention relates generally to overhead consoles for motor vehicles, and specifically to overhead consoles suitable for the storage of diverse objects of various sizes and shapes, which do not overly intrude into the vehicle's passenger compartment.

2. Background Art

As automotive design and technology evolve, more and more electronic accessories such as advanced audio systems, computers and the like find their way into modern automobile instrument panels. Accommodation of such accessories in the instrument panels leaves little extra room for storage therein. Today's sophisticated automobile purchaser demands interior storage which oftentimes cannot be fulfilled by the traditional instrument panel glove compartment. Thus, modern automotive interiors employ many diverse storage compartments such as bins in such areas as the instrument panel, interior door panels and the center console located between the driver and the passenger seat.

Recently, automotive ceilings have been explored as locations for storage compartments (overhead consoles) which accommodate such objects as garage door opener remote controls, sunglasses, and the like. For the most part, such overhead consoles have been dedicated to the storage of a particular item, employing a bin and sometimes a cover therefor specifically configured to the contour of an object of a predetermined size and shape. Examples of dedicated overhead consoles are found in U.S. Pat. Nos. 4,469,365 to Marcus et al (sunglasses) and 4,595,228 to Chu (garage door opener transmitter). While such dedicated storage compartments have proven useful for their limited, intended purposes, storage compartments adapted for accommodating various objects of diverse shapes such as the above-mentioned transmitter and sunglasses as well as objects such as keys, loose change, magnetic key cards and the like, would be much more convenient and thus likely to be better received by today's sophisticated and demanding automobile purchaser. However, since all overhead consoles project downwardly from the vehicle's headliner, the adaptability of such overhead consoles to the storage of diverse objects should not come at the expense of a significant intrusion of the console into vehicle interior.

DISCLOSURE OF INVENTION

In accordance with the present invention, an overhead console including a wall structure which defines a storage compartment, also includes a door for access to the interior of the console, in the shape of a simple tray which accommodates diverse objects of various sizes and shapes. The door is mounted in a downwardly and rearwardly facing portion of a lower wall of the wall structure for enhanced storage capacity with minimal rearward and downward intrusion into the vehicle's passenger compartment. Means are provided to limit the opening movement of the door to a generally horizontal position thereof, thereby minimizing the risk of small articles such as keys, change and the like accidentally falling out of the console when the door is open.

BRIEF DESCRIPTION OF THE DRAWING

FIG. 1 is a perspective view of the overhead console of the present invention with the door thereof shown in an open position; and FIG. 2 is a side elevation of the overhead console shown in FIG. 1, portions thereof being sectioned to show details of construction thereof.

BEST MODE FOR CARRYING OUT THE INVENTION

Referring to the drawing, the overhead console 5 of the present invention is shown at the forward-most portion of an automobile ceiling (headliner) 10. For reference purpose, the vehicle's sun visors 15 are shown in phantom at the forward edge 20 of the vehicle's roof which is shown in phantom at 23 in FIG. 2. The overhead console comprises a storage compartment 25 defined by a wall structure 30 which includes an upper wall 35 side walls 40 and a lower wall 45 in which a courtesy lamp module 50 may be mounted at the forward portion thereof. The rear portion of lower wall 45 includes a rearwardly and downwardly facing portion 55 having an opening 60 provided therein for access to storage compartment 25. The edges of the opening may be covered with a trim bezel 65, having resilient tabs 70 formed therein, the bezel being snap-fit within mating apertures (not shown) in forward and rear sidewalls 40. The bezel is also apertured (not shown) to receive a hinge pin 75 (FIG. 2) on which door 80 is pivotally mounted. A slot 85 in the upper edge of the bezel accommodates the end of wire spring 90 the other end of which is wrapped around pin 75. The wire spring may be employed to bias the door toward its illustrated, open position or in the alternative, to damp the opening movement of the door under its own weight. The bezel may also be provided with a curved slot 95 which receives a guide pin 100 formed in a door to guide the door's pivotal movement and limit opening movement of the door to a horizontal position.

Door 80 comprises a storage shelf including a bottom wall 105, the periphery of which is maintained in registry with opening 60 when the door is closed in a manner to be more fully described hereinafter. A rim 110 extends upwardly from the bottom wall and provides a means for inhibiting the spillage of small objects from the tray (door) when opened. As best seen in FIG. 2, the engagement of guidepin 100 with the end of slot 95 limits opening movement of the door to a generally horizontal position thereof to further inhibit spillage of loose articles therefrom when the door is opened.

The door is provided with any suitable latching means such as the "push-push" latch illustrated. This latch comprises a spring detent 115, self biased in a clockwise direction (as viewed in FIG. 2) from its position of attachment against upper compartment wall 35. Door 80, at opposite locations on the sides of rim 110 is provided with a catch 120 comprising a slot 125 defined by a recess 130 and a raised, generally V-shaped cam 135 having a notch 145 and surfaces 150 and 155 therein.

Operation of the door is as follows. In the closed position of the door as shown in phantom in FIG. 2, the free end of wire detent 115 is received within notch 145 in cam 135. When the door is pressed slightly upwardly, the end of detent 115 is freed from notch 145 and pivots slightly clockwise under its internal spring force, thereby allowing the door to pivot downwardly to an open position as the end of detent 115 slides along surface 150. To close the door, the door is merely pushed upwardly to its closed position, the end of detent 115 sliding along cam surface 155 which pivots the detent slightly counterclockwise until the detent reaches the end of cam surface 150 at which point it pivots slightly clockwise under its own internal spring force to snap the end thereof into notch 145, thereby latching the door in a closed position.

As best seen in FIG. 2, bottom wall 105 of the door blends smoothly into the rearwardly and downwardly facing portion of the lower wall. The angular orientation of this portion of the lower wall obliquely offsets this portion of the wall (and the door) from the general plane of the vehicle roof by an acute angle $\alpha$ of between approximately 20° and approximately 45°.

From the foregoing, it will be appreciated that the overhead console is ideally suited for conveniently accommodating articles of diverse shape and size. Since door 105 is formed in the shape of a generally flat tray, and since it does not rely on dedicated hooks, tabs or other appendages often employed in present overhead consoles to attach to articles or specific size and shape, the door will support within its rim, a myriad of articles. The angular orientation of the rearwardly and downwardly facing wall portion with respect to the vehicle's roof, provides a storage compartment of generous volume, and allows the door to be adequately sized with acceptable rearward and downward intrusion of the console into the passenger compartment. The smooth blending of the door into the rearward and downward facing wall portion presents an attractive appearance to occupants of the vehicle.

While a particuar embodiment of the overhead console of the present invention has been shown and described, it will be understood that various modifications thereof may suggest themselves to those skilled in the art. For example, while specific latch and hinge structures have been shown, various equivalent latch and hinge means may be employed without departing from the present invention. It is intended by the following claims to cover all such modifications as fall within the true spirit and scope of this invention.

Having thus described the invention, what is claimed is:

1. An overhead console for a motor vehicle having a roof and a windshield, said console being mounted to said roof, adjacent said windshield, and comprising a compartment defined by a wall structure for storage of objects therein and characterized by:

said wall structure comprising a generally planar, rearwardly and downwardly facing lower wall having an opening therein;

said console further including a rearwardly and downwardly facing door covering said opening and allowing selective access to an interior of said compartment through said opening;

said door comprising a storage shelf including:

a bottom wall, having a periphery which is maintained in registry with said opening when said door is closed, and a rim extending upwardly from said bottom wall of said door for inhibiting spillage of small objects therefrom when opened; and means connected to said door and said wall structure limiting opening movement of said door to a generally horizontal position thereof.

2. The overhead console of claim 1, characterized by said bottom wall of said door blending smoothly into said rearwardly and downwardly facing portion of said lower wall.

3. The overhead console of claim 2, characterized by said door, when closed, and said rearwardly and downwardly facing portion of said lower wall being obliquely offset from said vehicle roof.

4. The overhead console of claim 3, characterized by said door, when closed, and said rearwardly and downwardly facing portion of said lower wall being angularly offset from approximately 20° to approximately 45° from said vehicle roof.

* * * * *